(12) United States Patent
Takakuwa

(10) Patent No.: US 8,203,935 B2
(45) Date of Patent: Jun. 19, 2012

(54) SIGNAL TRANSMITTING DEVICE FOR SWITCHING FORWARDING DESTINATION

(75) Inventor: Makoto Takakuwa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 68 days.

(21) Appl. No.: 12/339,489

(22) Filed: Dec. 19, 2008

(65) Prior Publication Data

US 2009/0245097 A1    Oct. 1, 2009

(30) Foreign Application Priority Data

Mar. 28, 2008  (JP) ................. 2008-088391

(51) Int. Cl.
   G06F 11/00    (2006.01)
(52) U.S. Cl. ........................ 370/217; 370/225
(58) Field of Classification Search ............... 370/241.1, 370/228, 227, 244, 60, 225, 386
   See application file for complete search history.

(56) References Cited

U.S. PATENT DOCUMENTS

| | | | | |
|---|---|---|---|---|
| 5,166,926 | A * | 11/1992 | Cisneros et al. | 370/392 |
| 6,044,059 | A * | 3/2000 | Olnowich | 370/225 |
| 7,489,625 | B2 * | 2/2009 | Varma | 370/217 |
| 7,502,314 | B2 * | 3/2009 | Shimizu | 370/227 |
| 2005/0180331 | A1 * | 8/2005 | Fujita | 370/241.1 |
| 2006/0002292 | A1 * | 1/2006 | Chang et al. | 370/225 |
| 2007/0047540 | A1 * | 3/2007 | Bragg et al. | 370/386 |
| 2008/0069114 | A1 | 3/2008 | Shimada | 370/395.31 |
| 2008/0186865 | A1 * | 8/2008 | Yong et al. | 370/244 |

FOREIGN PATENT DOCUMENTS

| | | |
|---|---|---|
| EP | 1146698 | 10/2001 |
| EP | 1718014 | 11/2006 |
| JP | 11-163926 | 6/1999 |
| JP | H11-163926 A | 6/1999 |
| JP | 2003-318983 | 11/2003 |
| JP | 2003-318983 A | 11/2003 |
| JP | 2008-067085 | 3/2008 |
| JP | 2008-78906 | 4/2008 |
| WO | 02/23780 | 3/2002 |
| WO | 02/099448 | 12/2002 |

OTHER PUBLICATIONS

Combined Search and Examination Report, mailed Apr. 23, 2009, in corresponding British Patent Application No. GB0823661.4 (6 pp.).
Japanese Office Action mailed Apr. 17, 2012 for corresponding Japanese Application No. 2008-088391, with English-language translation.

* cited by examiner

Primary Examiner — Kwang B Yao
Assistant Examiner — Syed M Bokhari
(74) Attorney, Agent, or Firm — Fujitsu Patent Center

(57) ABSTRACT

A device includes: an ingress interface unit determining an output port of an input signal, adding destination information including information on the output port, and outputting the signal; two or more egress interface units; a switch unit receiving the signal including the destination information, determining a forwarding destination of the signal based on the destination information, and forwarding the signal to at least one of the egress interface units as the forwarding destination; a notifying unit notifying of, when a fault related to the output port occurs, alternative destination information including information of an alternative output port; a registration unit registering the alternative destination information in a storage unit in a way that associates the alternative destination information with the destination information; and a translation unit rewriting, when the storage unit is registered with the alternative destination information, the destination information in the signal into the alternative destination information.

8 Claims, 15 Drawing Sheets

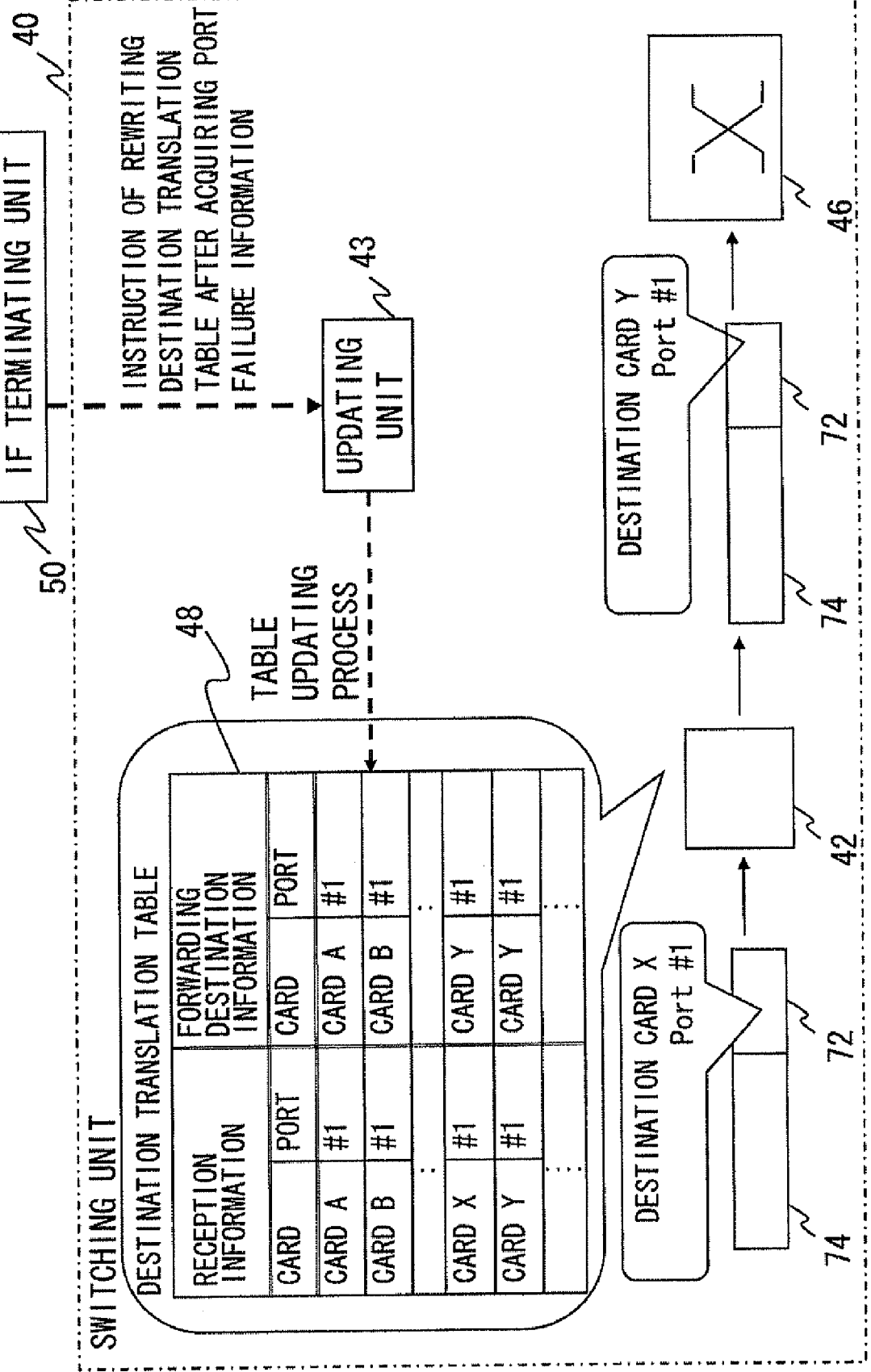

FIG. 7A

DESTINATION TRANSLATION TABLE

| RECEPTION INFORMATION | | FORWARDING DESTINATION INFORMATION | |
|---|---|---|---|
| CARD | PORT | CARD | PORT |
| CARD A | #1 | CARD A | #1 |
| CARD B | #1 | CARD B | #1 |
| ⋮ | ⋮ | ⋮ | ⋮ |
| CARD X | #1 | CARD Y | #1 |
| CARD Y | #1 | CARD Y | #1 |
| ⋮ | ⋮ | | |

48

CORRESPONDING TO ADDRESS — CORRESPONDING TO DATA

SIGNAL TRANSMITTING DEVICE FOR SWITCHING FORWARDING DESTINATION

CROSS-REFERENCE TO RELATED APPLICATION

This application is based upon and claims the benefit of priority of the prior Japanese Patent Application No. 2008-088391, filed on Mar. 28, 2008 in the Japanese Patent Office, the entire contents of which are incorporated by reference.

FIELD

The present invention discussed herein is related to a signal transmitting device.

BACKGROUND

Over the recent years, a telephone network built up by an existing circuit switching technology has been replaced with an IP (Internet Protocol) packet-based communication network using a packet switching technology. With this transition, a layer-2 backbone transmission system is gradually replaced with an Ethernet (registered trade mark)-based transmission system exhibiting high compatibility with the IP packet. The backbone circuit is requested to accommodate large-capacity lines and to have a fault tolerance. Devices, which support the packet switching network, adopt a new Ethernet (registered trade mark)-based technology and are underway to follow the conventional large-capacity accommodation and fault tolerance so as to satisfy the market demands.

A link aggregation, a "1+1 switching" technique and a "1:N switching" technique are exemplified as a main signal redundancy-structuring means that is generally employed in a packet forwarding device (which is termed a [packet device] as the case may be) accommodating such a large capacity of lines.

The link aggregation is a technology by which a plurality of physical lines is virtually bundled as if treating one single line. The link aggregation is defined by IEEE802.3d.

The use of the link aggregation enables a quantity of bands, into which specific bands of the physical lines are totaled, to be employed. For example, when five lines each having 1 Gbps are virtually bundled, a 5 Gbps virtual communication band can be employed. The communication band can be expanded without preparing a high-speed line by making use of the link aggregation. This scheme enables a flexible and efficient network to be designed. Therewith, there is redundancy in which when a trouble occurs in one of the physical lines, the communication can continue by use of another line.

FIG. 11 illustrates an example of a block diagram of the packet forwarding device. In FIG. 11, a packet device 100 includes a main signal unit 200 and a monitor control unit 300 that monitors and controls the main signal unit. The main signal unit 200 includes a plurality of interface terminating units 500 and a switch unit 400 which forwards a packet to an output port.

The packet forwarding device 100 is, in terms of reducing an initial introduction cost and taking a parts packaging area into consideration, constructed of a plurality of card-type circuit units according to functions such as the monitor control unit 300, the switch unit 400 and the interface terminating units 500.

FIG. 12 is a diagram illustrating one example of a general method (which is referred to as a method 1) of determining a link aggregation route when configuring the link aggregation in the packet forwarding device 100.

In FIG. 12, a port (Port) #1 of a card (Card) X defined as the interface terminating unit 500$x$ and a port #1 of a card Y defined as the interface terminating unit 500$y$ belong to a single link aggregation group. When the packet, which should be forwarded to this link aggregation group, is input to a card A defined as the interface terminating unit 500$a$ on an ingress (Ingress) side, the card A determines which port, the port #1 of the card X or the port #1 of the card Y on an egress (Egress) side, the packet should be forwarded to, and forwards the packet to only any one of the ports. In the example illustrated in FIG. 12, the packet is forwarded to the port #1 of the card X. Thereafter, the packet is forwarded to the card X via the switch unit 400 and is output from the port #1 of the card X.

FIG. 13 is a diagram illustrating one example of a general method (which is referred to as a method 2) of determining the link aggregation route in the case of configuring the link aggregation in the packet forwarding device 100.

The method 2, unlike the method 1 by which the ingress interface terminating unit 500 determines a forwarding destination port to which the packet is output, is a technique of forwarding the packets to all of the interface terminating units 500 included by the link aggregation group and discarding the packets that are not forwarded by the egress interface terminating unit 500.

In FIG. 13, the link aggregation group is organized by the port #1 of the card X defined as the interface terminating unit 500$x$ and the port #1 of the card Y defined as the interface terminating unit 500$y$. When the packet, which may be forwarded to this link aggregation group, is input to the card A as the ingress interface terminating unit 500$a$, the card A forwards this packet to the switch unit 400. The switch unit 400 copies the packet and forwards the packets to both of the card X and the card Y on the egress side. The card X and the card Y on the egress side determine whether the received packet is to be output to the external line or discarded, and executes the determined process. In FIG. 13, the card X outputs the packet to the external line, while the card Y discards the packet.

Thus, the link aggregation route determination scheme based on the method 2 is that the switch unit 400 copies the packet and forwards the same packet to all of the egress interface units 500 of the link aggregation group, and the egress interface units 500 determine which the packet is output to the external line or discarded.

In comparison between the method 1 and the method 2, the method 2 is that the switch unit 400 forwards the packet to all of the interface terminating units 500 corresponding to the redundancy-structured lines. Therefore, a band between the interface terminating unit 500 scheduled to discard the packet and the switch unit 400 gets futile.

The method 1 is that the ingress interface terminating unit 500 determines the output port for the packet, and the packet is forwarded to only the interface terminating unit having this output port. Hence, the futility of the band in the case of applying the method 2 does not occur. Accordingly, in the case of performing the link aggregation, generally the method 1 is applied.

The method 1 has, however, the following problem. FIG. 14 is an explanatory diagram illustrating the problem inherent in the method 1. In FIG. 14, the port #1 of the interface terminating unit #4 (IF#4) and the port #1 of the interface terminating unit #5 (IF#5) belong to the same link aggregation group.

According to the method 1, the ingress interface terminating unit 500 determines the destination route for the packet. Therefore, all of the interface terminating units 500 in the packet device 100 need to know a status of the destination route in order to make a proper determination.

Accordingly, when a fault occurs in the link related to one (for example, the port #1 of IF#4) of the ports belonging to the link aggregation group, what is requested is to notify all of the interface terminating units 500 including IF#4 of such a piece of information that the fault has occurred in the link of the port #1 of IF#4.

In an example of FIG. 14, the interface unit IF#4 notifies the monitor control unit 300 of the link fault occurring at the port #1 ((1) in FIG. 14), and the monitor control unit 300 notifies all of the interface terminating units 500 of the fault occurring at the port #1 of IF#4 ((2) in FIG. 14). Each interface terminating unit 500, when receiving the notification from the monitor control unit 300, changes the setting about the should-be-determined output port so as not to forward the packet addressed to the link aggregation group to the port #1 of IF#4 ((3) in FIG. 14). FIG. 14 illustrates an example of forwarding the information via the monitor control unit 300. Even when forwarding the information by another method, all of the ingress interface terminating units 500 have to be notified of the fault information. Accordingly, the number of the fault notifying destinations rises as the number of the interface terminating units 500 increases.

The respective interface terminating units 500 are notified of the link fault not in parallel but serially in terms of a structure of the device. In this case, for example, such a status of switching transit period exists that the notification of the fault about IF#1 and the setting update based on this notification have been completed, while even the notification of the fault about IF#6 is not yet made. As the number of the link fault notifying destinations rises, the status of the switching transit period gets elongate, and the time expended for switching increases.

As described above, according to the method 1, when the fault occurs in the output destination, it is requested that all of the interface terminating units within the packet forwarding device be notified of the fault information. Accordingly, as a capacity of the lines accommodated in the device increases, the time requested for switching gets elongate. In recent years, an improvement of reliability is requested of the IP packet-based communications. Hence, it is desirable to reduce the time required for switching. Note, this request is not limited to IP packet-base communications and occurs in the communication using the technique of redundancy-structured transmission routes.

[Patent document 1] Japanese Patent Laid-Open Publication No. 2003-318983

[Patent document 2] Japanese Patent Laid-Open Publication No. H11-163926

SUMMARY

According to an aspect of the invention, a signal transmitting device includes:

an ingress interface unit determining an output port of an inputted signal, adding destination information including information of the determined output port to the signal and thus outputting the signal added to the destination information;

two or more egress interface units having the output port for the signal;

a switch unit connecting to the ingress interface unit and to the two or more egress interface units, receiving the signal including the destination information output from the ingress interface unit, determining a forwarding destination of the signal based on the destination information included in the signal and forwarding the signal to at least one, as the determined forwarding destination, of the two or more egress interface units;

a notifying unit notifying of, when a failure related to the output port occurs, alternative destination information including information of an alternative output port;

a registration unit receiving the alternative destination information from the notifying unit and registering the alternative destination information in a storage unit in a way that associates the alternative destination information with the destination information; and a translation unit rewriting, when the storage unit is registered with the alternative destination information associated with the destination information in the signal input to the switch unit, the destination information in the signal into the alternative destination information so that the switch unit determines a forwarding destination of the signal base on the alternative destination information.

According to the aspect of the present invention, when there occurs a fault related to the output port specified by the destination information included in the signal, the notifying unit for notifying of the alternative destination information including the information of the alternative output port may be notified of the occurrence of the failure, thereby enabling the number of failure-occurrence notifying destinations to be restrained and the time requested for switching to be reduced.

The present invention can include, as other modes thereof, a signal output destination switching method of a signal transmitting device having the same features as the signal transmitting device described above has, a program for making a computer function as the signal transmitting device, and a readable-by-computer recording medium stored with this program.

Additional objects and advantage of invention will be set forth in part in the description which follows, and in part will be obvious from the description, or may be learned by practice of the invention. The object and advantage of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 6 is a diagram illustrating the operational example of updating the destination translation table;

FIG. 7A is an example diagram illustrating the destination translation table using a memory;

DESCRIPTION OF EMBODIMENT

Embodiments of the present invention will hereinafter be described with reference to the drawings. Configurations in the following embodiments are exemplifications, and the present invention is not limited to the configurations in the embodiments.

First Embodiment

Figure 1:
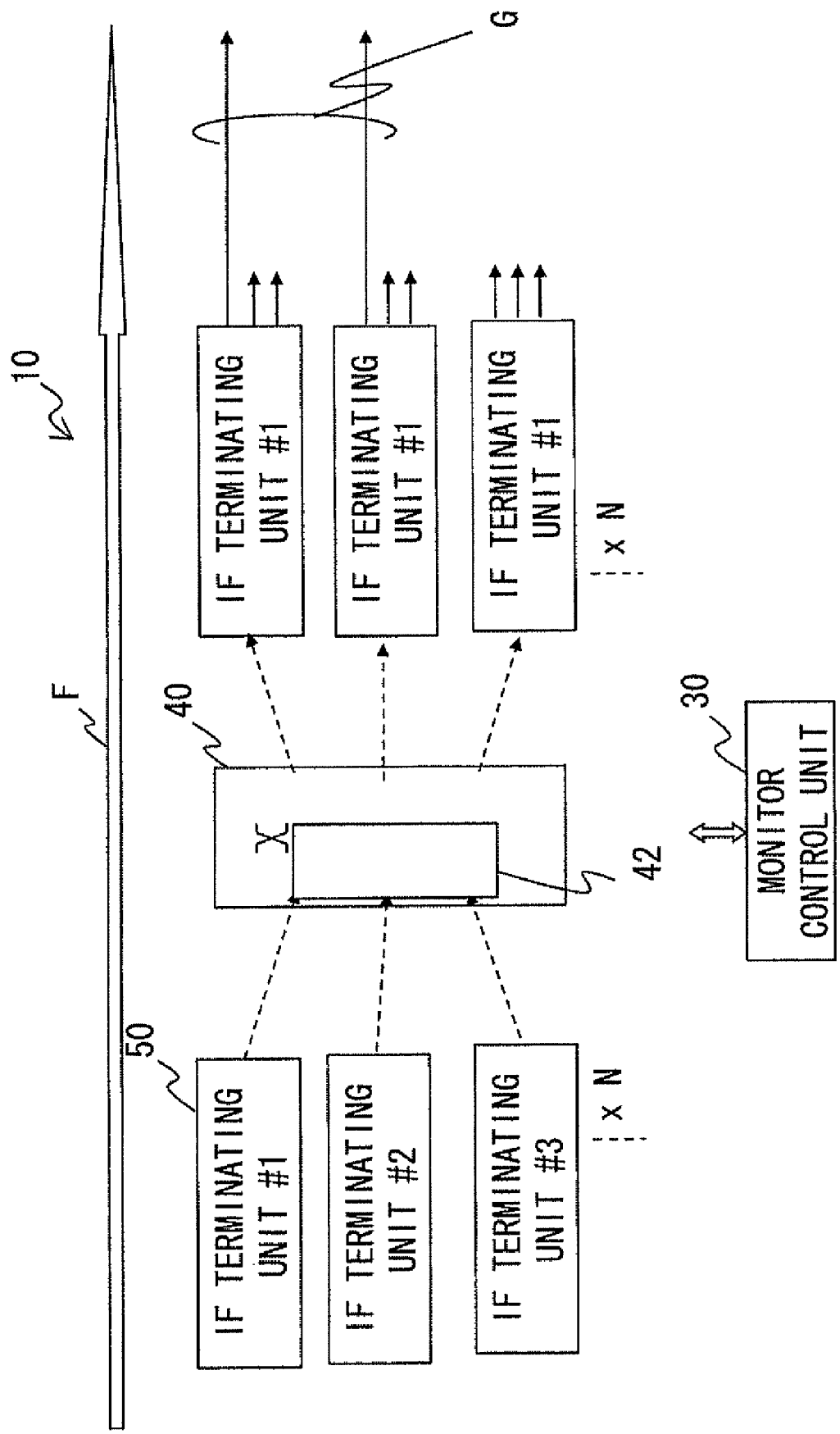
FIG. 1 is an example diagram illustrating an outline of functions of a signal transmitting device in an embodiment of the present invention.

FIG. 1 is a diagram illustrating an example of an outline of functions of a signal transmitting device in an embodiment of the present invention. In FIG. 1, a packet forwarding device (packet device) 10 serving as the signal transmitting device can accommodate a large capacity of lines. The packet forwarding device 10 includes a plurality of interface terminating units 50 each executing a process of inputting and outputting packets, a switch unit 40 executing a process of forwarding the packets to between the interface terminating units 50, and a monitor control unit 30 that controls the respective interface terminating units 50 and the switch unit 40. The switch unit 40 includes a destination translation unit 42 which determines the egress interface terminating unit 50 defined as a packet forwarding destination.

Each of the monitor control unit 30, the switch unit 40 and the interface terminating unit 50 can be configured as a circuit unit including an ASIC (Application Specific Integrated Circuit), a CPU (Central Processing Unit) and a memory such as a CAM (Control Addressable Memory) and a TCAM (Ternary CAM). The circuit unit is configured as a card type unit.

The packet forwarding device 10 has a housing formed with a plurality of slots into which the card type circuit units (which will hereinafter be simply referred to as [cards]) are inserted, and can have a configuration for realizing a plurality of predetermined functions as the packet forwarding device 10 through transferring and receiving the data between the cards inserted into the respective slots and electrically connected (via, for example, a bus).

Figure 2:
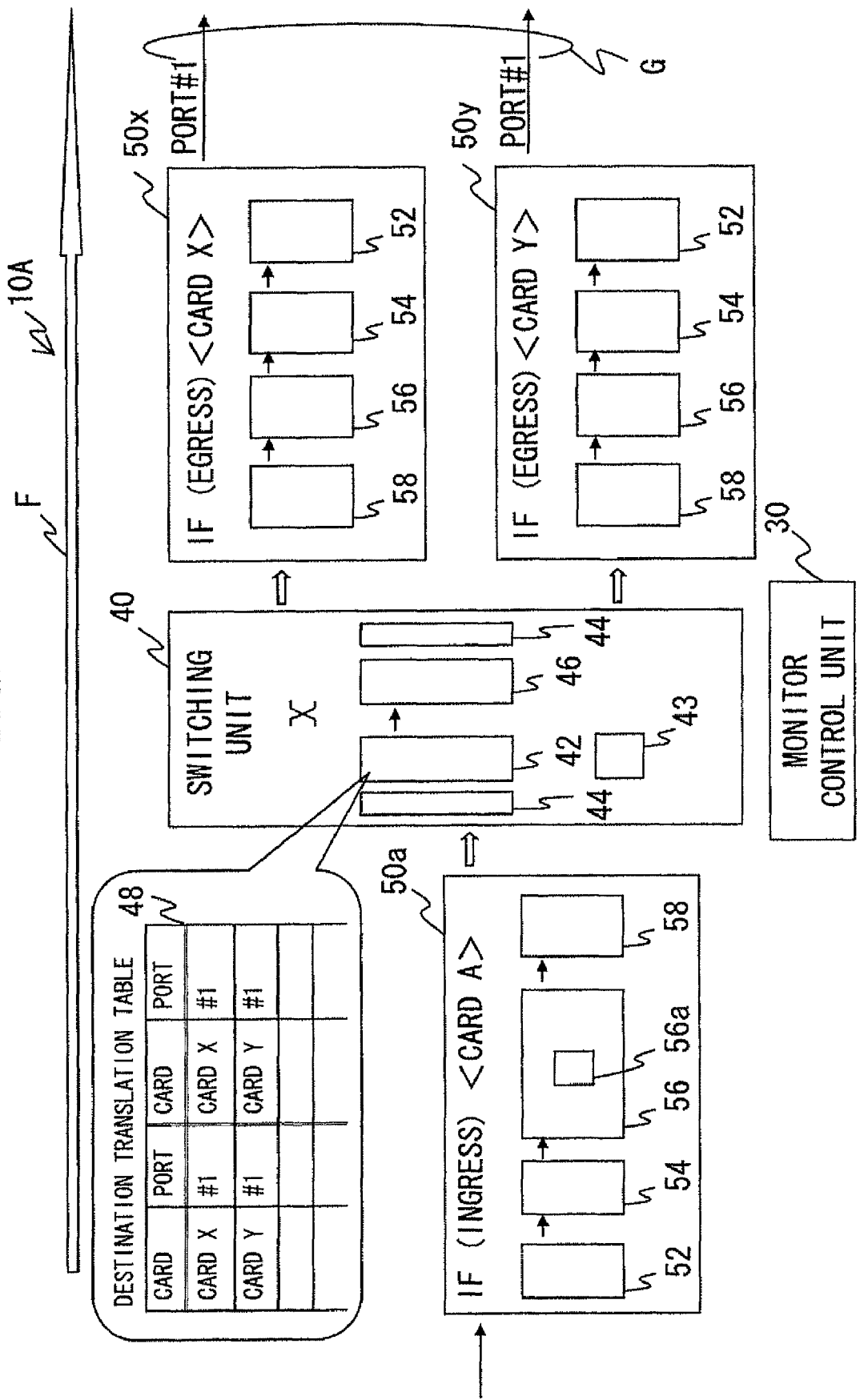
FIG. 2 is an example diagram illustrating a detailed configuration of a packet forwarding device.

FIG. 2 is a diagram illustrating an example of a detail configuration of the packet forwarding device. FIG. 2 illustrates the detail configuration of the a packet forwarding device 10A to which the configuration of the packet forwarding device 10 as illustrated in FIG. 1 is applied, this detail configuration being necessary for the packet forwarding device 10A serving as a main signal redundancy-structuring means to implement link aggregation.

The packet forwarding device 10A illustrated in FIG. 2 includes the switch unit 40, interface terminating units 50a, 50x, 50y (which are generically termed the [interface terminating units 50] in the case of explaining these units without any distinction therebetween) as the interface units connected to the switch unit 40, and the monitor control unit 30.

The example illustrated in FIG. 2 is that the interface terminating unit 50a (a card A) is disposed on an ingress side, while the interface terminating unit 50x (a card X) and the interface terminating unit 50y (a card Y) are disposed on an egress side.

The ingress interface terminating unit 50a includes a physical layer processing unit (PHY (PHYsical layer chip)) 52 which replaces a level and a code of the signal input from an external line with a level and a code of a signal adapted to within the device, a MAC (Media Access control) layer processing unit 54 that recognizes, based on the signal transmitted from the PHY 52 and executes a frame terminating process, a signal processing unit 56 that processes the input signal and attaches an address (information of a forwarding destination port), and a switch interface unit 58 serving as an interface with the switch unit 40. The signal processing unit 56 includes a forwarding destination distributing unit 56a which determines a frame (signal) output destination port from within the plurality of ports belonging to a link aggregation group.

The forwarding destination distributing unit 56a refers to a MAC address table (unillustrated) and thus determines a port, as an output port, associated with a destination MAC address within the frame. At this time, when the output port specifies the link aggregation group (which is normally recognized as one port), the forwarding destination distributing unit 56a selects, as the output port, one of the ports belonging to the link aggregation group. A method of determining the port for allocating the frames from within the link aggregation group is provided as a link aggregation algorithm. For example, the frame allocation port is determined in a way that uses, as keys, a destination MAC address, a source MAC address, a destination IP address and a source IP address of the frame.

The switch unit 40 includes a switch interface unit 44 serving as an interface with the interface terminating unit 50, the destination translation unit 42 that translates the destination (output port) acquired by the ingress interface terminating unit 50a based on a destination translation table 48, a switching unit 46 that switches over the packet according to the destination information attached to the packet, and an updating unit 43 that updates the destination translation table 48.

At least one destination translation unit 42 is provided in the whole packet forwarding device. When the packet forwarding device has a plurality of redundancy-structured switch units, there is provided a plurality of destination translation units 42 of which the number corresponds to the number of packet forwarding paths that are redundancy-structured by the plurality of switch units. A detailed operation of the destination translation unit 42 will be explained later on.

Each of the egress interface terminating units 50X, 50y includes the switch interface unit 58 serving as the interface with the switch unit 40, the signal processing unit 56 which converts the forwarded packet into an actually outputting signal format within the device, the MAC 54 that assembles the frame to be output, and the PHY 52 that converts the level and the code of the intra-device signal into those suited to the output to the external line.

Note that the physically identical circuit units can be applied to the ingress interface terminating unit 50 and the egress interface terminating units 50x, 50y. A processing procedure of the input signal is simply reversed depending on the signal input direction (the ingress side or the egress side).

Figure 3:
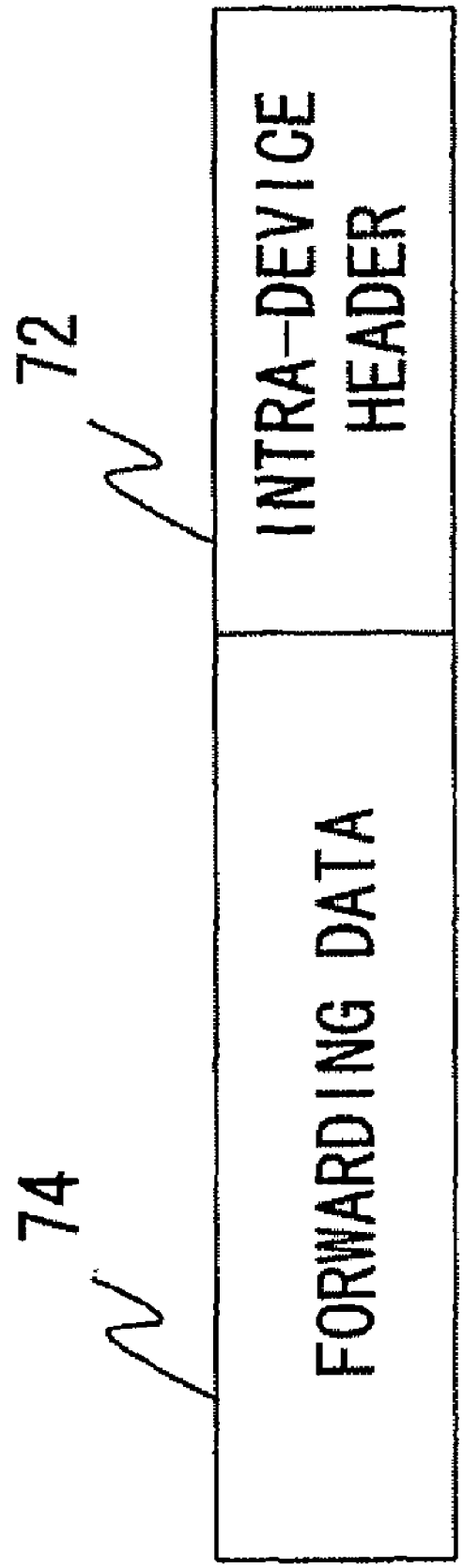
FIG. 3 is an example diagram illustrating a format of a frame (intra-device frame) forwarded within the packet forwarding device.

FIG. 3 illustrates an example of a format of a frame (intra-device frame) forwarded within the packet forwarding device 10A. The intra-device frame contains an intra-header 72 and a forwarding data field 74, which are effective only in the packet forwarding device 10A. The signal input (received) in the packet forwarding device 10A from the external line is converted into the frame (corresponding to forwarding data 74) by the MAC 54 in the ingress interface terminating unit 50a, and the frame is attached with the intra-device header 72 in the forwarding destination distributing unit 56a of the signal processing unit 56.

The intra-device header 72 is stored with various items of information used within the packet forwarding device 10A and with destination information (corresponding to the destination card and the destination port) acquired by the ingress forwarding destination distributing unit 56a. The switching unit 46 of the switch unit 40 forwards, based on the destination information stored in the intra-device header 72, the intra-device frame. The signal processing unit 56 of each of the egress interface terminating units 50x, 50y detaches the intra-device header 72 from the intra-device frame. Thereafter, the packet is assembled from the forwarding data 74 and is output from the proper output port.

Figure 4:
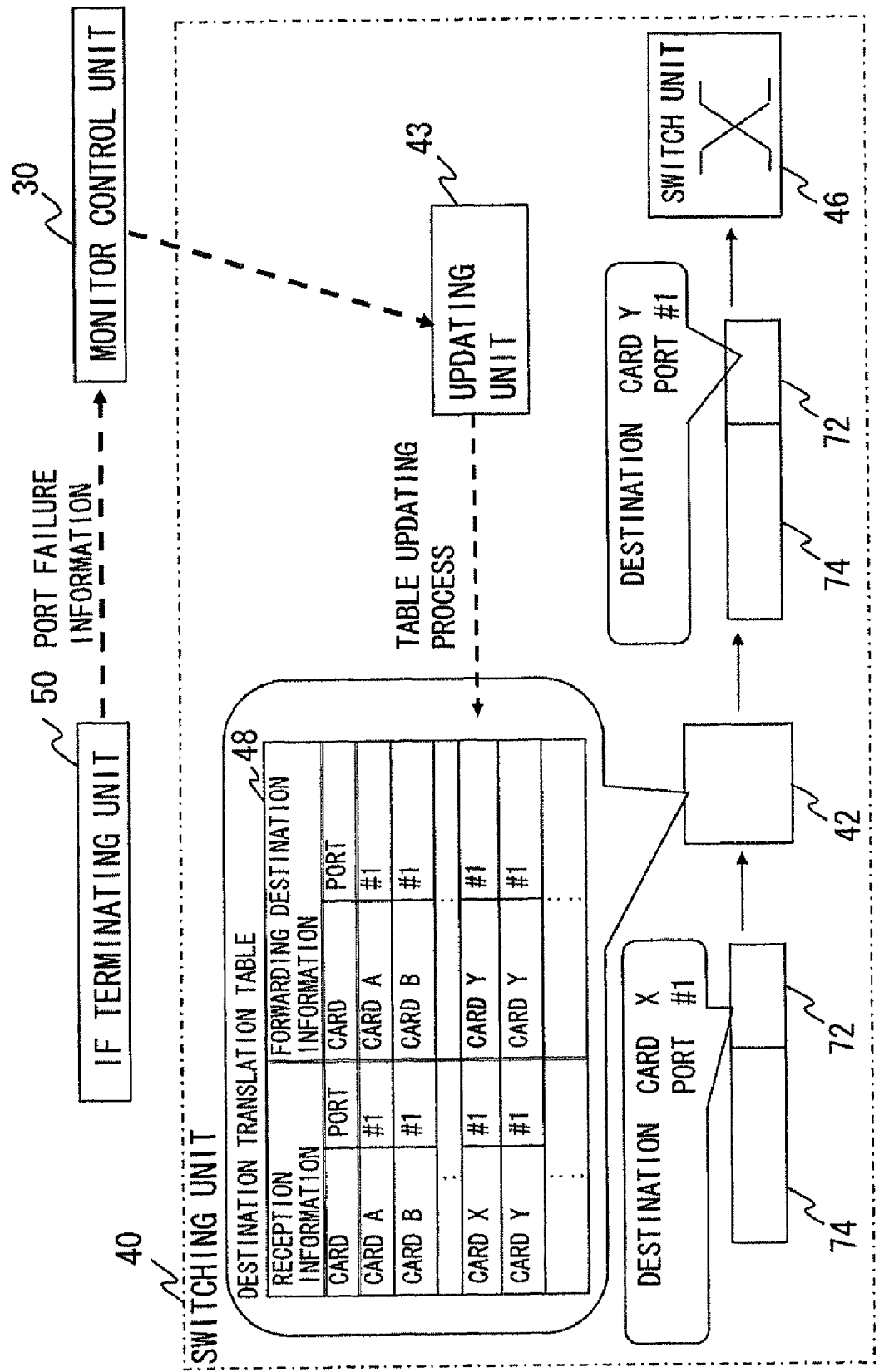
FIG. 4 is an example diagram illustrating a process of how a destination translation unit rewrites an intra-device header.

FIG. 4 is an explanatory diagram of a function of the destination translation unit 42 illustrated in FIG. 2. The destination translation unit 42 has the destination translation table 48, and also has a function of changing (rewriting) the [destination card] and the [destination port] written as the destination information to the intra-device header 72, according to contents stored (registered) in the destination translation table 48. The destination translation table 48 is generated on, for example, a storage device as a component of the switch unit 40.

The destination translation table 48 is stored with reception information and forwarding destination information associated with the reception information. The reception information is organized by the [destination card] and the [destination port], and corresponds to the destination information in the intra-device header 72 in the intra-device frame received by the destination translation unit 42. The forwarding destination information is organized by a 2-tuple consisting of the [destination card] and the [destination port], which is associated with the 2-tuple consisting of the [destination card] and the [destination port] of the reception information.

The destination translation unit 42, when the intra-device frame is input, extracts (reads) the [destination card] and the [destination port] as the destination information from the intra-device header 72, and refers to the destination translation table 48 in a way that uses this destination information as a search key, thereby acquiring the forwarding destination information associated with the reception information coincident with the destination information. Namely, the destination translation unit 42 searches the destination translation table 48 for the forwarding destination information associated with the destination information, and reads the hit forwarding destination information. The destination translation unit 42 rewrites the destination information in the intra-device header 72 according to the thus-acquired forwarding destination information.

An entry in the destination translation table 48 is, when any failure does not occurs in the destination, has such a scheme that the reception information (the destination information ([destination card] and the [destination port]) in the inputted intra-device frame) is coincident with the forwarding destination information (the [destination card] and the [destination port]).

Accordingly, when the failure does not occur, there is no change in the destination information in the intra-device header 72 before and after the rewriting process by the destination translation unit 42. Hence, it follows that the switching unit 46 switches (forwards) the frame toward the [destination card] and the [destination port] defined as the forwarding destinations determined by the forwarding destination distributing unit 56a of the ingress interface terminating unit 50a.

For example, when the destination information in the intra-device header 72 of the frame received from the ingress interface terminating unit 50a illustrates the [destination card A] and the [destination port #1], the destination translation unit 42 acquires the forwarding destination information associated with the destination information (for example, the reception information) such as the [destination card A] and the [destination port #1] from the destination translation table 48. At this time, when any failure related to the port #1 of the card A does not occur, the destination translation unit 42 acquires the forwarding destination information such as the [destination card A] and the [destination port #1]. Accordingly, in this case, the values of the destination information in the intra-device header 72, which are output from the destination translation unit 42, become the [destination card A] and the [destination port #1] that are the same as those when input to the destination translation unit 42.

On the other hand, as in the case of a failure in the output port for outputting the packet, a failure in a port taking a face-to-face relation with the output port for outputting the packet or a failure in a face-to-face device or a failure in the link establishing a connection between the output port and the port of the face-to-face device, when such a failure occurs in the output destination of the packet, the packet can not be forwarded to the face-to-face device even when forwarding the intra-device frame toward the output port where the failure occurs. Accordingly, a scheme in the link aggregation is that when the failure related to the output destination occurs, a substitute output destination (the card and the port) is determined in a way that stops forwarding the intra-device frame toward the output destination, and the intra-device frame is forwarded to the substitute output destination.

For actualizing this scheme, in the first embodiment, as illustrated in FIG. 4, the monitor control unit 30 monitors the link failure and the port failure in the respective interface terminating units 50 (at least the egress interface terminating units). The monitor control unit 30, when the link failure and the port failure occur in the interface terminating unit 50, determines the forwarding destination (the card and the port) as a substitute for the fault-occurrence forwarding destination (the card and the port), and notifies the switch unit 40 of an instruction of updating the forwarding destination information with the thus-determined card and port. At this time, the monitor control unit 30 notifies the respective interface terminating units 50 of neither the failure occurrence nor the instruction of changing the destination information.

For example, when the failure occurs in the port #1 of the card X, it follows that the port #1 of the card X can not be utilized for forwarding the packet. In this case, the monitor control unit 30 determines that the port #1 of the card Y belonging the same link aggregation group takes over a role of the port #1 of the card X, and notifies the switch unit 40 that the [card X] and the [port #1] in the "forwarding destination information" field in the destination translation table 48 are rewritten (updated) with the [card Y] and the [port #1]. Then, the switch unit 40 (for example, the updating unit 43 for the destination translation table 48 in the switch unit 40) updates (rewrites) the forwarding destination information in the entry associated therewith in accordance with the instruction.

A post-rewriting entry is exemplified (such as the [destination card X] and the [destination port #1] in the "reception information" field and the [destination card Y] and the [destination port #1] in the "forwarding destination information" field) in the destination translation table 48 illustrated in FIG. 4.

After rewriting (updating) the destination translation table 48, for example, when the intra-device frame containing the [destination card X] and the [destination port #1] in the "destination information" field in the intra-device header 72 is input, the destination translation unit 42 acquires the [destination card Y] and the [destination port #1] in the "forwarding destination" field, which are associated with the [destination card X] and the [destination port #1] in the "reception information" field, by referring to the destination translation table 48, and rewrites the destination information in the intra-device header 72.

The switch unit 40 receiving the intra-device frame from the destination translation unit 42 switches the intra-device frame to the [destination card Y] and the [destination port #1] as if being the intra-device frame of which the intra-device header 72 is attached with the [destination card Y] and the [destination port #1] in the "destination information" field by the signal processing unit 56 of the ingress interface terminating unit 50.

Thus, in the first embodiment, the monitor control unit 30 notifies only the updating unit 43 in the switch unit 40, of an instruction to update the forwarding destination information in the wake of the occurrence of the failure, and the forwarding destination of the intra-device frame can be switched over to the substitute output destination simply by updating the forwarding destination information in the destination translation table 48 without any changes in the operations of the ingress interface terminating unit 50, the destination translation unit 42 and the switching unit 46. Hence, as compared with the conventional techniques, the number of the destinations of the failure-related notification is remarkably decreased. Therefore, the time requested for switching over the forwarding destination (packet output destination) of the intra-device frame is reduced.

Figure 5:
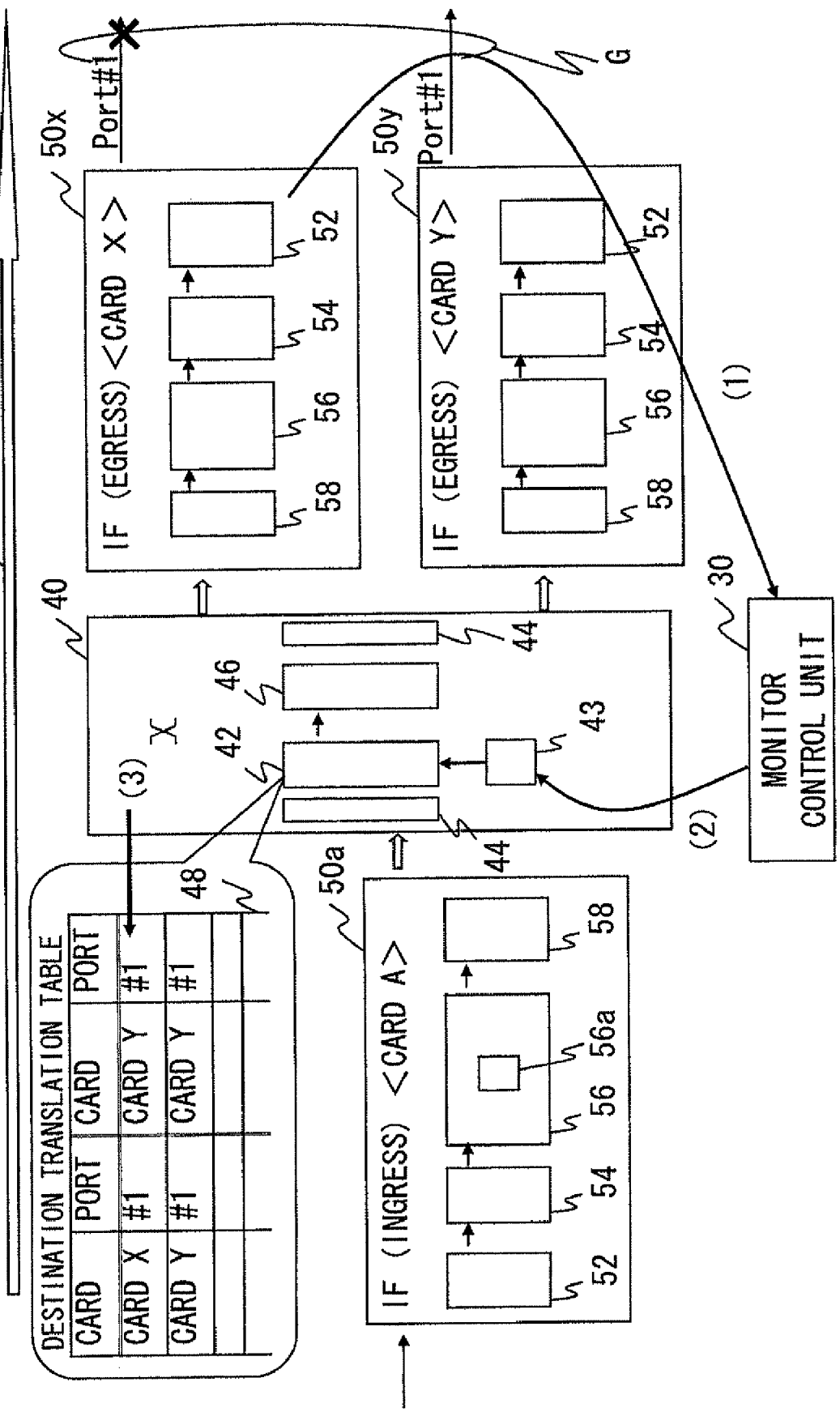
FIG. 5 is a diagram illustrating an operational example of updating a destination translation table.

FIG. 5 illustrated an operational example of how the destination translation table 48 is updated. The interface terminating unit 50 detecting the failure at the output destination as in the case of the failure at the port notifies the monitor control unit 30 of the occurrence of the failure, the monitor control unit 30 issues the instruction to update the destination translation table 48 to the updating unit 43 of the switch unit 40, and the updating unit 43 receiving the update instruction updates the destination translation table 48.

In FIG. 5, the port #1 of the interface terminating unit 50x (card X) and the port #1 of the interface terminating unit 50y (card Y) belong to the same link aggregation group. For example, when the port #1 of the card X gets into a failure, the port #1 of the card Y belonging to the same link aggregation group takes over the process for the frame forwarded to the port #1 of the car X. The monitor control unit 30 previously retains the information (the information on at least the output port switching destination (the egress interface terminating unit (the card and the output port) defined as the substitute output destination)) on this type of link aggregation group.

The egress interface terminating unit 50x, when detecting the port failure at the port #1 of the card X or link abnormality (the failure related to the output port), notifies the monitor control unit 30 of this failure information ((1) in FIG. 5). The monitor control unit 30 receiving the notification from the interface terminating unit 50x notifies the switch unit 40 of the failure occurring (the occurrence of the fault) at the port #1 of the card X.

The monitor control unit 30 gets the update contents of the destination translation table 48 contained in the notification ((2) in FIG. 5). To be specific, the monitor control unit 30 sends the notification containing the update instruction for updating, with the [card Y] and the [port #1], the [card X] and the [port #1] in the "forwarding destination information" field, which are associated with the [card X] and the [port #1] in the "reception information" field. The updating unit 43 of the switch unit 40 receiving the notification rewrites the (update target) entry in the destination translation table 48 according to the update instruction given from the monitor control unit 30. Thereafter, the switch unit 40, in the case of receiving the frame containing the port #1 of the card X in the "destination information" field, forwards the frame to the port #1 of the card Y.

According to the packet forwarding device 10A, the destination translation table 48 is prepared, the destination translation unit 42 rewrites the destination information in the intra-device header 72 into the associated forwarding destination information in the destination translation table 48, and the switching unit 46 switches the intra-device frame (forwards the frame to the egress side) in accordance with the post-rewriting destination information. When the failure occurs in the forwarding destination specified by the forwarding destination information (the card and the port) registered in the destination translation table 48, the monitor control unit 30 determines the substitute output destination, and the forwarding destination information is rewritten (updated) with the information (the card and the port) specifying the substitute output destination.

Thereafter, when the destination translation unit 42 and the switching unit 46 perform the same operations as those before rewriting the forwarding destination information, it follows that the intra-device frame is forwarded not to the forwarding destination with the failure (the forwarding destination before being rewritten) but to the substitute forwarding destination (the forwarding destination after being rewritten). Namely, the forwarding destination of the intra-device frame (the output destination of the packet) is switched over.

Thus, the switch unit 40 is provided with the destination translation table 48, thereby eliminating the necessity for forwarding the failure information to all of the interface terminating units and enabling the time requested for the switching to be reduced.

Further, the process of updating the destination translation table can take such a scheme as to be executed when the card failure (the device failure) occurs in addition to when the link failure and the port failure occur. For example, the monitor control unit 30 periodically transmits an operation acknowledgment signal to the interface terminating unit 50 (the card), then recognizes that the card falls into the device failure when unable to receive a response to this operation acknowledgment signal within a predetermined period of time, subsequently determines the card and the port as the substitute output destination, and can notify the updating unit 43 of the instruction to update the destination translation table 48 corresponding to a result of this determination. Alternatively, when the interface terminating unit 50 notifies the monitor control unit 30 of recovery from the port failure and the link failure, an available scheme is that the updating unit 43 is notified of the update instruction for resetting the forwarding destination information to the original status.

Note that in the first embodiment, the destination translation table 48 is updated by the monitor control unit 30 monitoring the information given from all of the interface terminating units 50. The update of the destination translation table 48 can involve such a scheme that the updating unit 43 receives, as illustrated in FIG. 6, without via the monitor control unit 30, the notification from the interface terminating unit 50 that detects the failure information of the port getting into the failure and updates the destination translation table 48 based on the update contents (the forwarding destination information of the substitute output destination) contained in the notification. In this case, it is requested that the egress interface terminating unit 50 determines the substitute output destination when detecting the failure.

Modified Example

The destination translation table 48 described above can be structured by use of a CAM (Contents Addressable Memory).

Figure 7B:
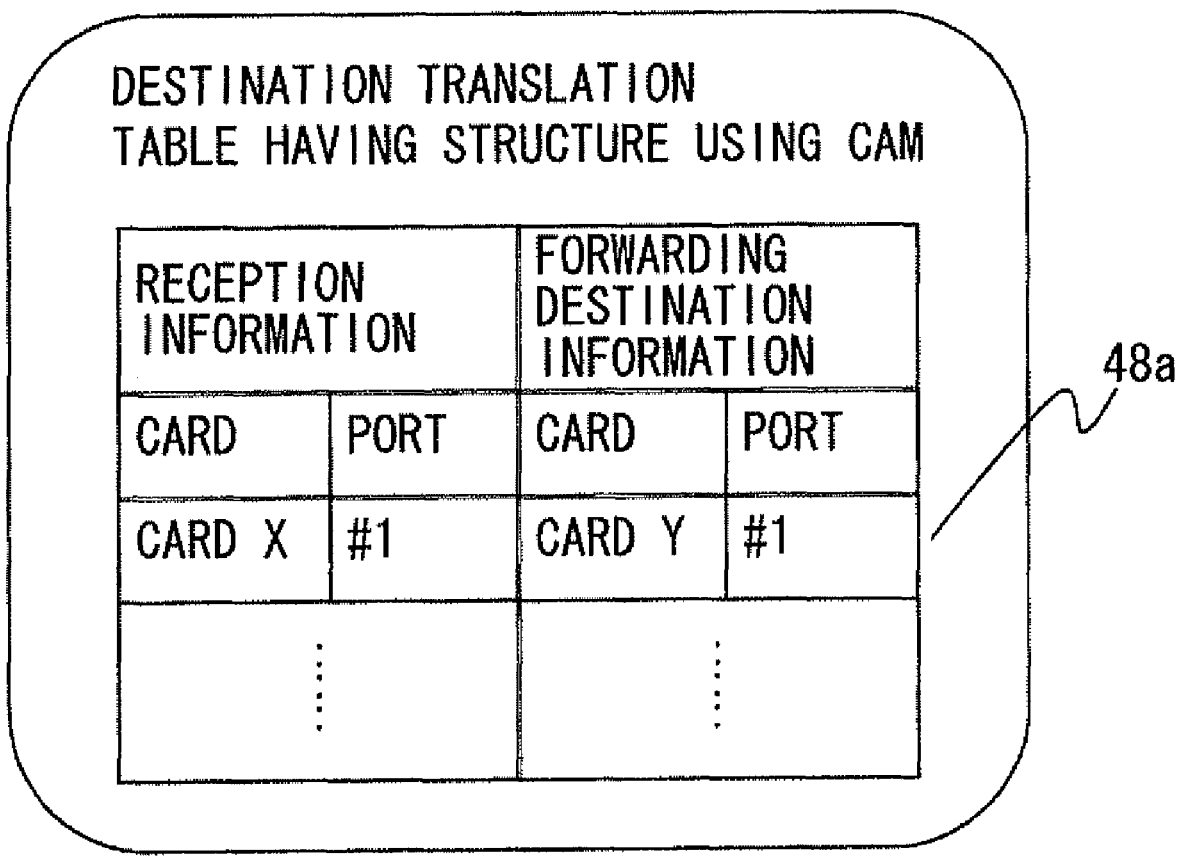
FIG. 7B is an example diagram illustrating the destination translation table structured by use of a CAM.

FIGS. 7A and 7B are comparative diagrams each illustrating the destination translation table. The destination translation table 48 illustrated in FIG. 7A has the same data structure as the destination translation table 48 illustrated in FIG. 4 has. The destination translation table 48 is structured so that the [destination card] and the [destination port] as the destination information of the received frame are registered in the "reception information" field, and the items of the forwarding destination information taking values associated with these items of reception information are written. The items of reception information correspond to addresses in the memory, and the values equivalent to (associated with) the addresses are written as the items of forwarding destination information. This type of data structure entails registering one value (one item of forwarding destination information) associated with one address in the memory. At this time, the values associated with all of the addresses are registered irrespective of a relationship between the addresses and the values associated with the addresses such as illustrating whether each address is coincident with the value associated with the address or not. Namely, there exist the entries corresponding to the number of the items of reception information, and the destination translation table 48 needs an address space stored with all the reception information.

By contrast, in a destination translation table 48a using the CAM as illustrated in FIG. 7B, unlike the destination translation table 48 in FIG. 7A, only the entries in which the reception information differs from the forwarding destination information are registered. The case, in which the reception information differs from the forwarding destination information, connotes a case where the failure occurs in the output destination specified by the [destination card] and the [destination port] in the "reception information" field. Namely, when none of the failure occurs, no entry is registered in the destination translation table 48a.

The entry registration process does not differ in a case where the monitor control unit 30 notifies of the update instruction and in a case where the interface terminating unit 50 notifies of the update instruction. Each of the monitor control unit 30 and the interface terminating unit 50 notifies the updating unit 43 of the update instruction containing both of the fault-related destination information (reception information) and the update-related forwarding destination information.

Figure 8:
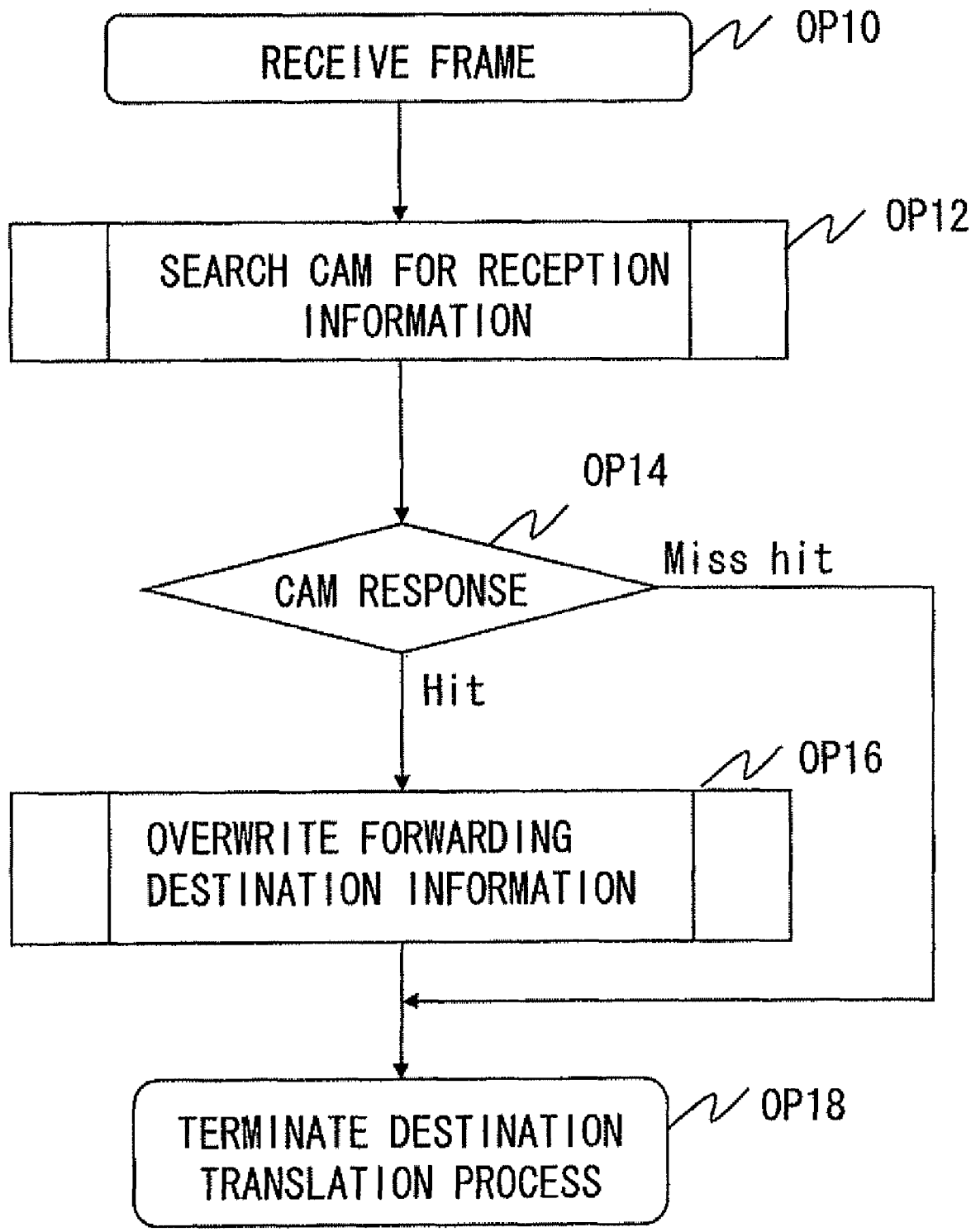
FIG. 8 is an example flowchart illustrating an operation of rewriting destination information of the frame in the case of structuring the destination translation table by use of the CAM.

FIG. 8 is a flowchart illustrating the operation of rewriting the destination information in the intra-device frame in the case of structuring the destination translation table by use of the CAM. When the switch unit 40 receives the intra-device frame (OP10), the destination translation unit 42 sequentially searches for the reception information in the destination translation table 48a by using, as search keys, the [destination card] and the [destination port] defined as the destination information of the intra-device header 72 of the intra-device frame (OP12). When hitting the reception information coincident with the [destination card] and the [destination port] defined as the search keys, the forwarding destination information associated with the reception information is acquired as response data (OP14: Hit). The destination information of the received intra-device frame is rewritten based on the response data (OP16). The frame with the rewritten destination information is forwarded to the switching unit 46, and the process is terminated (OP18. When hitting none of the reception information coincident with the [destination card] and the [destination port] as the search keys (OP14: Miss hit), the intra-device frame is forwarded to the switching unit 46 without translating the destination information of the intra-device frame, and the process is terminated (OP18).

Thus, when the destination translation table is structured by use of the CAM, the address space necessary for the destination translation table can be decreased to the greater degree. For example, when all the ports take 2-port link aggregation groups, the number of the translation destinations is half the number of the ports, and hence the indispensable address becomes half the number of the ports.

Further, when the destination translation table is structured of the CAM, this scheme is effective in a case of registering the information, for example, on a flow-by-flow basis in the destination translation table. Whereas when the CAM is not employed, even when forwarded via a different flow to the same 2-tuple of the [destination card] and the same [destination port], the information must be registered on the flow-by-flow basis in the destination translation table, and a tremendous address space is requested. In the case of structuring the destination translation table by use of the CAM, it may be sufficient to register only the entry associated with the failure-caused port, and therefore the should-be-prepared address space can be reduced.

Second Embodiment

The packet forwarding device 10A serving as a main signal redundancy-structuring means redundancy-structures the packet forwarding route by performing the link aggregation. A "1+1 switching" technique and a "1:N switching" technique carried out in an SDH/SONET (Synchronous Digital Hierarchy/Synchronous Optical Network)-based transmission device can be applied to a packet forwarding route switching technique, which will hereinafter be described.

The "1+1 switching" technique involves preparing a single standby unit for a single active unit (the card and the port). When the failure occurs in the active unit, the switchover to the standby unit is conducted, and the standby unit continues (takes over) the process executed so far by the active unit.

Figure 9:
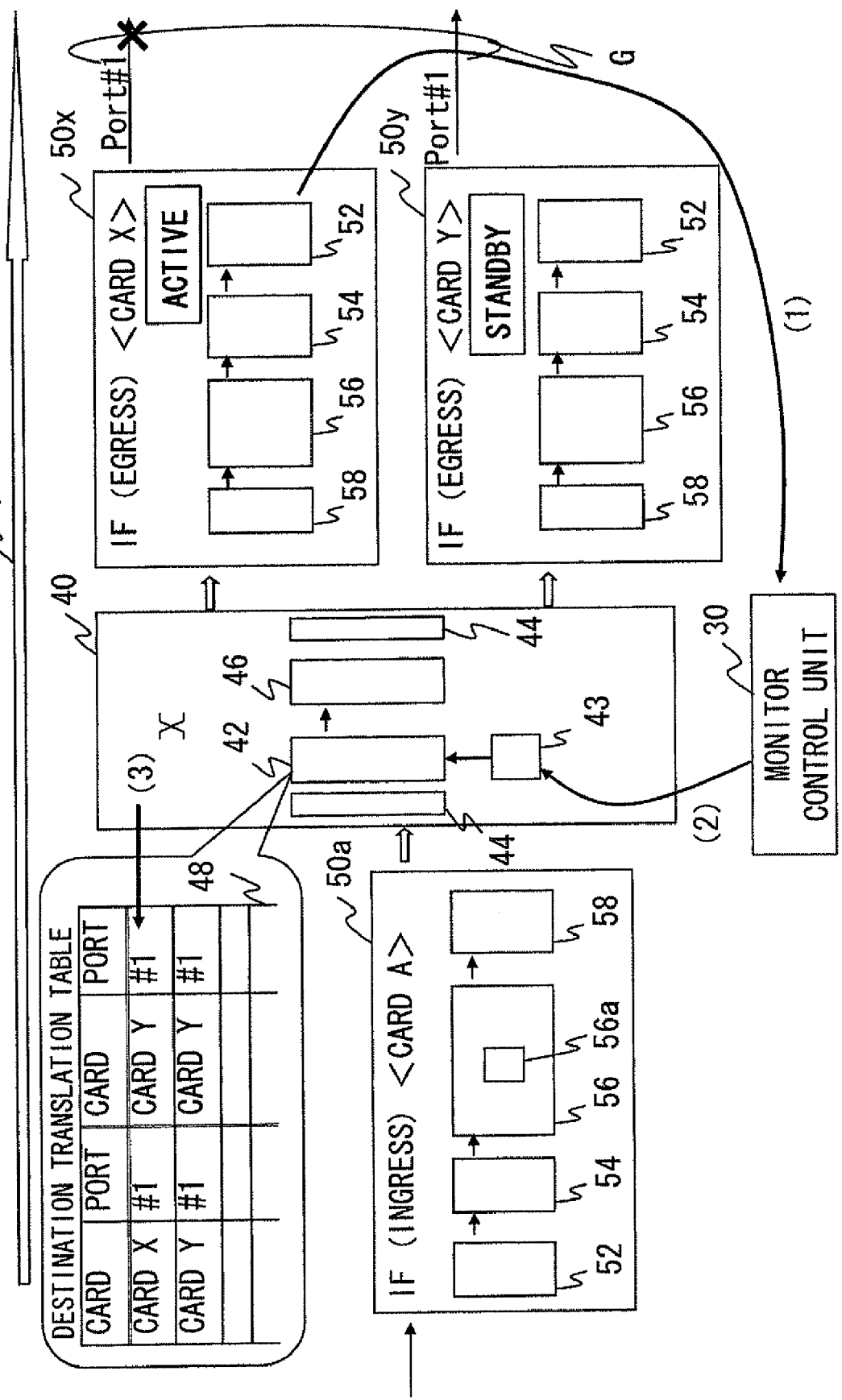
FIG. 9 is an example diagram illustrating the operation of updating an address translation table of the packet forwarding device in the case of adopting a "1+1 switching" technique as a main signal redundancy-structuring means.

FIG. 9 is a diagram illustrating an example of updating the destination translation table of the packet forwarding device in the case of adopting the "1+1 switching" technique as a main signal redundancy structuring means. The descriptions of the portions common to the first embodiment will be omitted.

A packet forwarding device 10B in FIG. 9 includes the port #1, serving as an active port, of the interface terminating unit 50x (the card X) and the port #1, serving as a standby port for the port #1 of the card X, of the interface terminating unit 50y (the card Y).

For example, when the active port #1 of the card X gets into the failure, the port #1 of the standby card Y takes over the process for the frame to be forwarded to the port #1 of the card X. The monitor control unit 30 previously retains such an item of information that the standby port for the active port #1 of the card X is the port #1 of the card Y.

The egress interface terminating unit 50x, when detecting the port failure of the port #1 of the card X or the link abnormality (the failure related to the output port), notifies the monitor control unit 30 of the failure information ((1) in FIG. 9). The monitor control unit 30 receiving the notification from the interface terminating unit 50x notifies the switch unit 40 that the port #1 of the card X gets into the failure (the failure occurs)

The monitor control unit 30 gets the notification to contain the update contents of the destination translation table 48 ((2) in FIG. 9). Specifically, the monitor control unit 30 sends to the switch unit 40 the notification containing an update instruction for updating the forwarding destination information associated with the [card X] and the [port #1] in the "reception information" field into the [card Y] and the [port #1] from the [card X] and the [port #1]. The updating unit 43 of the switch unit 40 receiving the notification rewrites the entry concerned in the destination translation table 48 in accordance with the update instruction given from the monitor control unit 30. Thereafter, when the switch unit 40 receives the frame containing the destination information, for example, the port 41 of the card X, the frame is forwarded to the port #1 of the card Y.

According to the packet forwarding device 10B, when the failure occurs at the active port, the monitor control unit 30 notifies the switch unit 40 of the occurrence of the failure and the information about the standby port associated with the active port, and the forwarding destination information associated with the active port in the destination translation table 48 is rewritten (updated with) into the standby port.

Thereafter, the intra-device frame is forwarded not to the active port but to the standby port by use of the destination translation unit 42 and the switching unit 46. Namely, the forwarding destination of the intra-device frame (the output destination of the packet) is switched over.

Thus, in the case of adopting the "1+1 switching" technique as the main signal redundancy-structuring means, the necessity for forwarding the failure information to all of the interface terminating units is eliminated by providing the switch unit 40 with the destination translation table 48, and the time needed for switching can be reduced.

Third Embodiment

Figure 10:
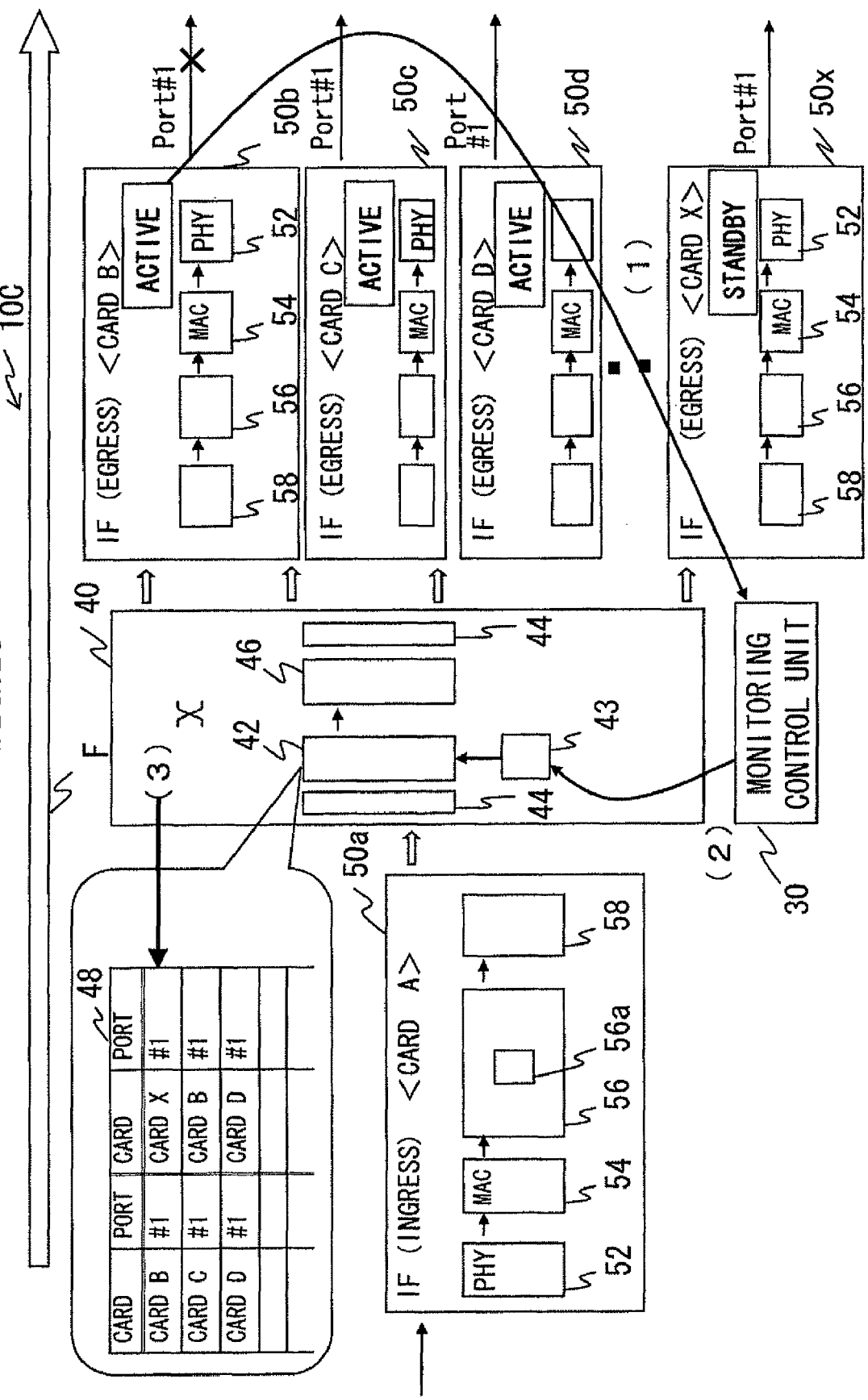
FIG. 10 is an example diagram illustrating the operation of updating the address translation table of the packet forwarding device in the case of adopting a "1:N switching" technique as the main signal redundancy-structuring means.
Figure 11:
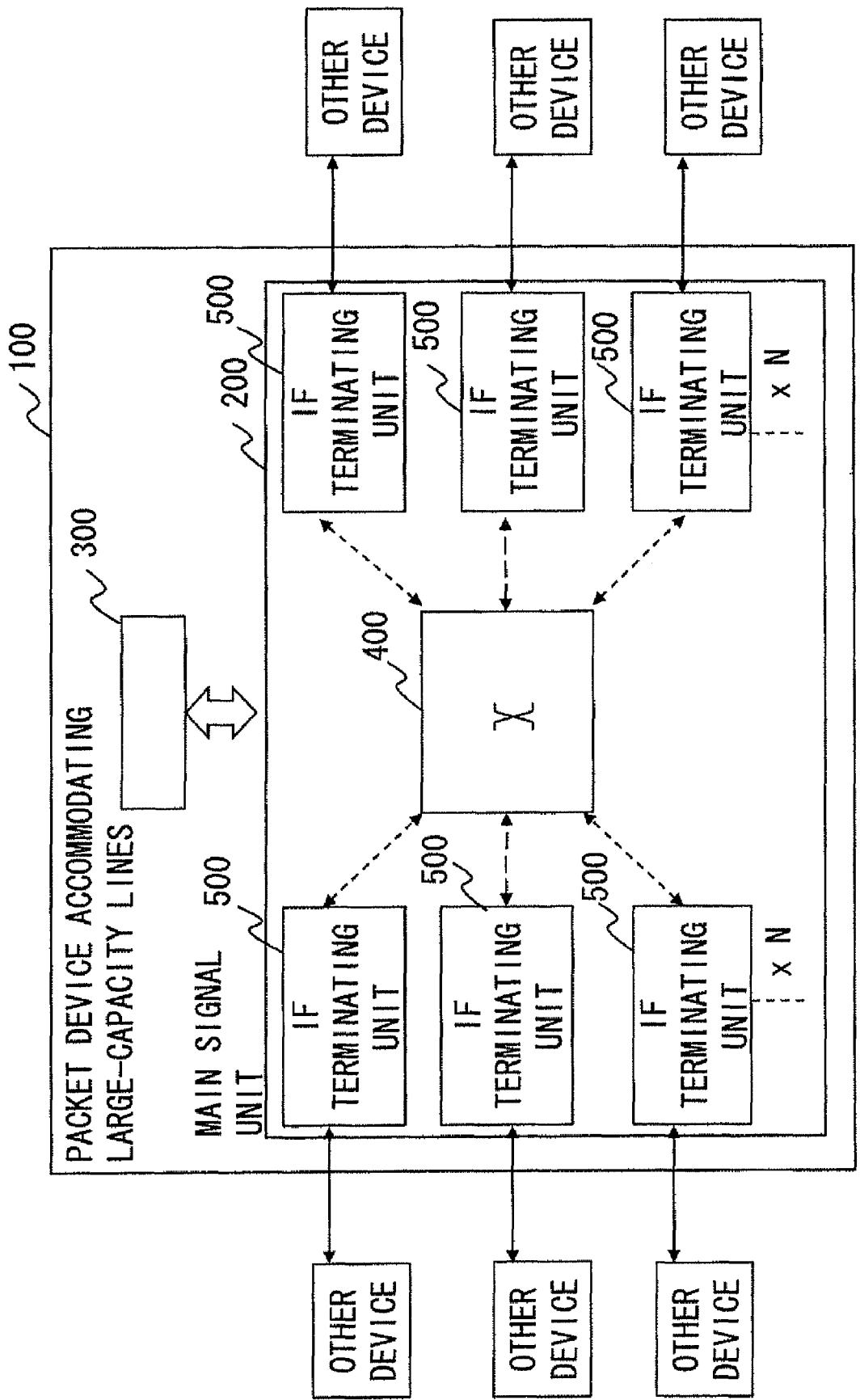
FIG. 11 is an example block diagram of a packet device accommodating large capacity lines.
Figure 12:
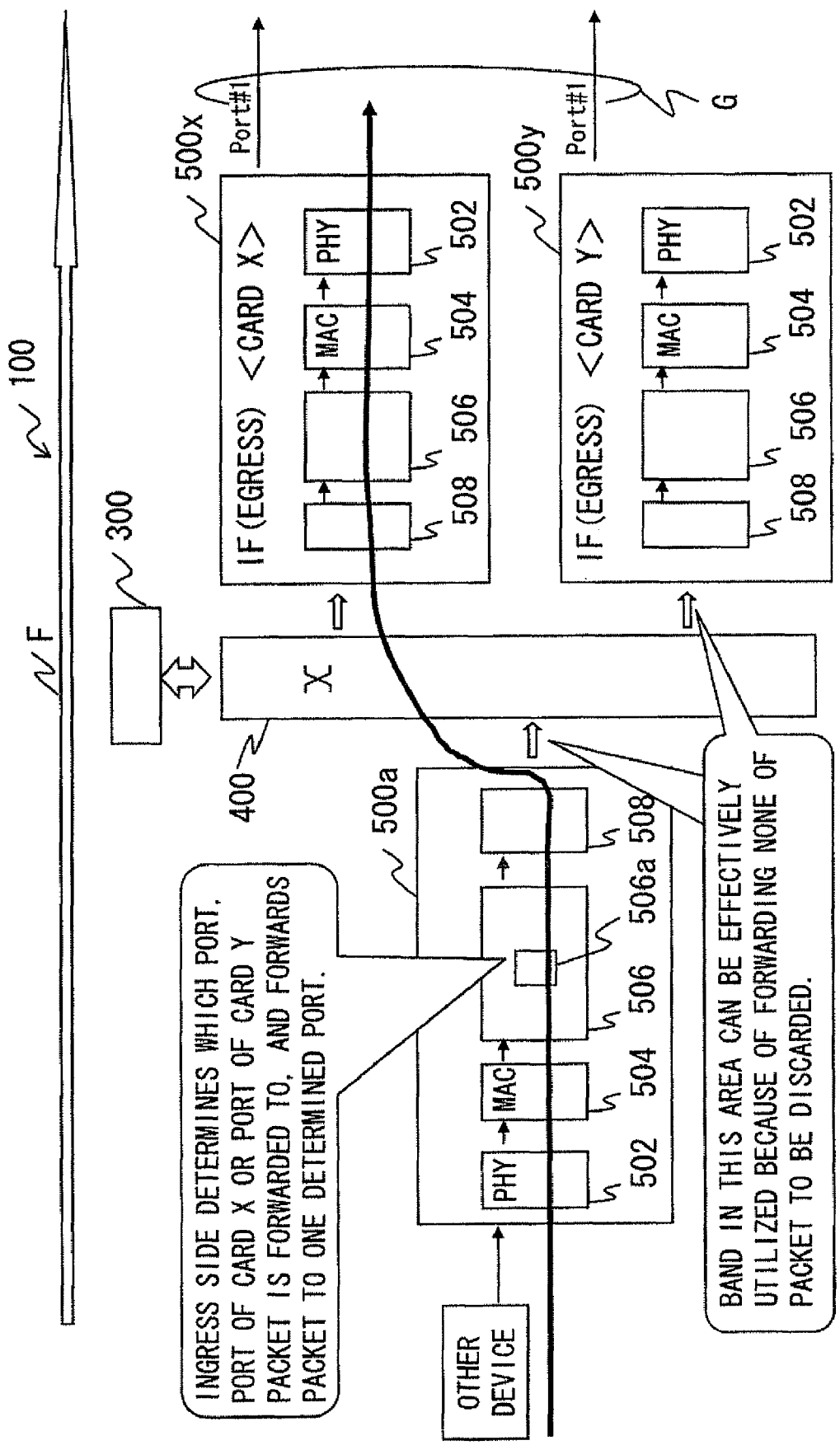
FIG. 12 is a diagram illustrating one example of a general method of determining a link aggregation route in the case of building up a link aggregation.
Figure 13:
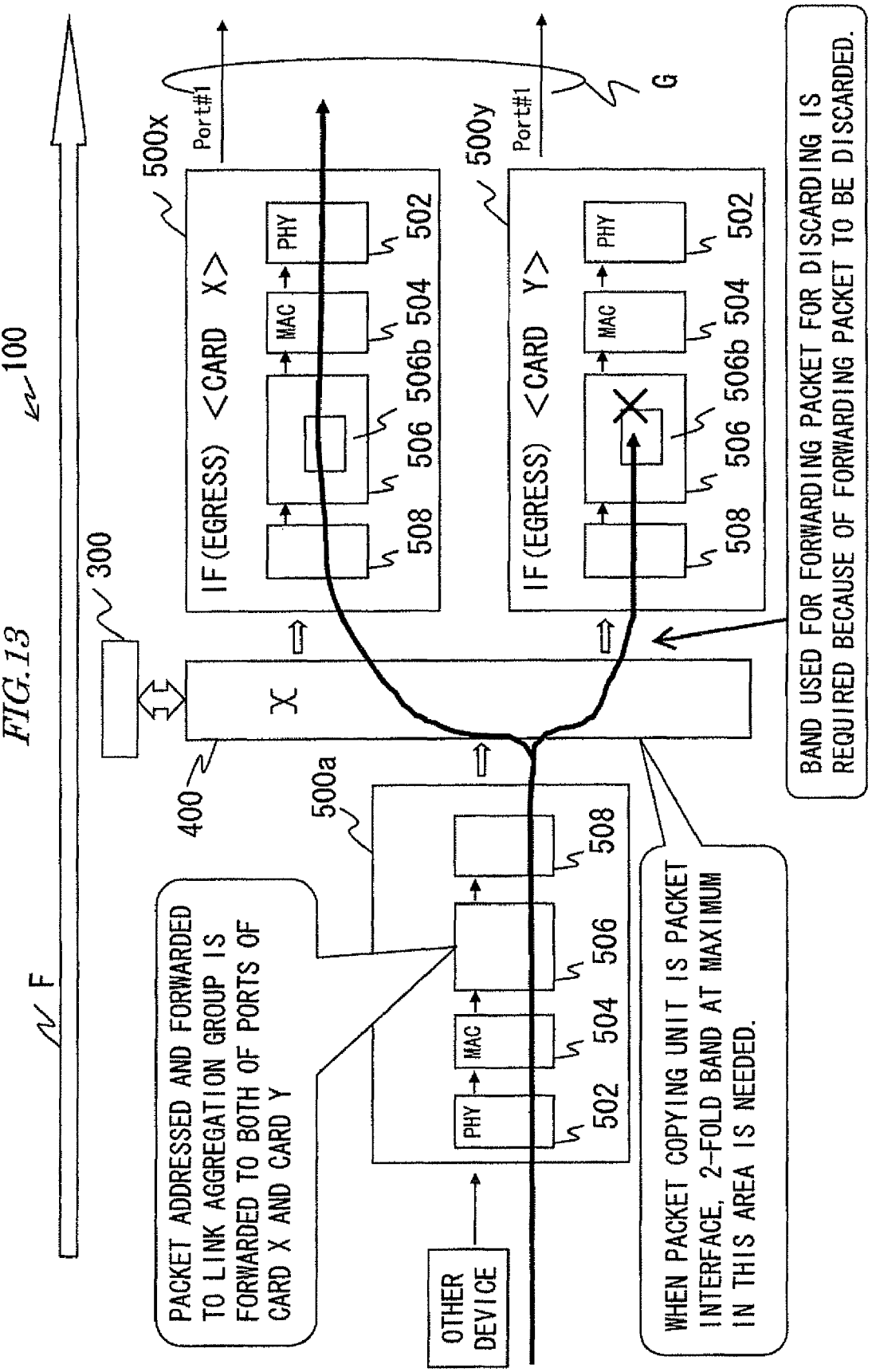
FIG. 13 is a diagram illustrating one example of the general method of determining the link aggregation route in the case of building up the link aggregation.
Figure 14:
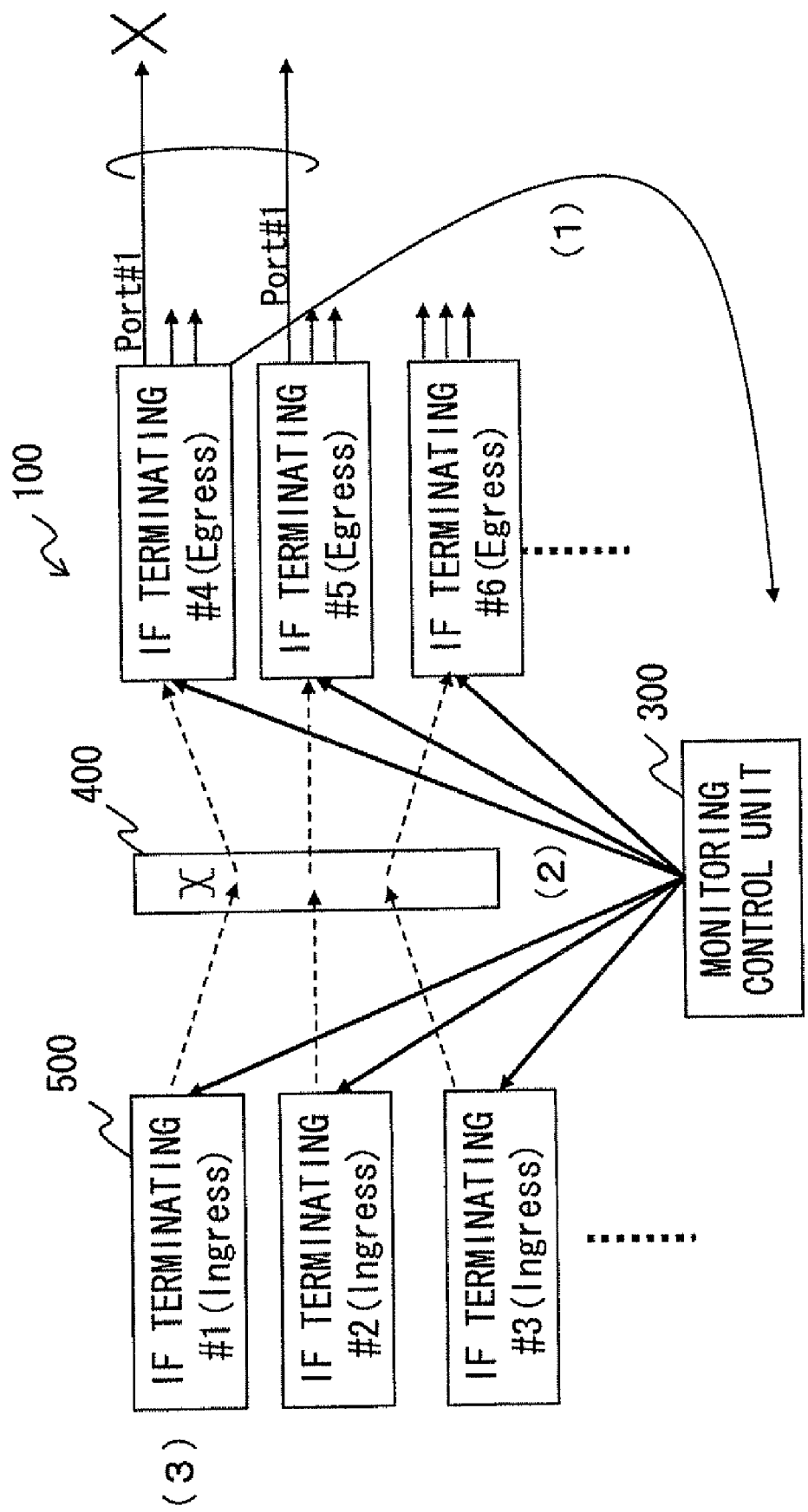
FIG. 14 is an example diagram of a method of forwarding link disconnection information in the case of determining the link aggregation route on an ingress side.

FIG. 10 is a diagram illustrating an example of updating the destination translation table of the packet forwarding device in the case of adopting the "1:N switching" technique as the main signal redundancy-structuring means. The explanations of the portions (components and operations), which are common to those in the first embodiment, are omitted.

The "1:N switching" technique involves preparing a single piece of standby unit common to N-pieces of active units (the cards and the ports), and using only the active unit when in the normal state. A scheme is that when the failure occurs in one of the N-pieces of active units, the standby unit takes over the process of the active unit undergoing the occurrence of the failure.

A packet forwarding device 10C in FIG. 10 includes N-pieces of interface terminating unit 50b (card B), interface terminating unit 50c (card C), interface terminating unit 50d (card D), etc and one interface terminating unit 50x (card B), wherein the ports #1 of the N-pieces of cards are used as active ports, while the port #1 of the interface terminating unit 50x (card X) is employed as the standby port common to the active ports #1 of the N-pieces of cards.

For example, when the failure occurs at the port #1 of the card B among the N-pieces of active ports, the standby port #1 of the card X takes over the process for the frame to be forwarded to the port #1 of the card B. The monitor control unit 30 previously retains the information illustrating that the port #1 of the card X is the standby port for the N-pieces of active ports.

The egress interface terminating units 50b, when detecting the port failure of the port #1 of the card B or the link abnormality (the failure related to the output port), notifies the monitor control unit 30 of the failure information ((1) in FIG. 10). The monitor control unit 30 receiving the notification from the interface terminating unit Sob notifies the switch unit 40 that the port #1 of the card B gets into the failure (the failure occurs).

The monitor control unit 30 gets the notification to contain the update contents of the destination translation table 48 ((2) in FIG. 10). Specifically, the monitor control unit 30 sends the notification containing an update instruction for updating the forwarding destination information associated with the [card B] and the [port #1] in the "reception information" field into the [card X] and the [port #1] from the [card B] and the [port #1]. The updating unit 43 of the switch unit 40 receiving the notification rewrites the entry concerned in the destination translation table 48 in accordance with the update instruction given from the monitor control unit 30. Thereafter, when the switch unit 40 receives the frame containing the destination information, for example, the port #1 of the card B, the frame is forwarded to the port #1 of the card X.

According to the packet forwarding device 10C, when the failure occurs at one of the N-pieces of active ports, the monitor control unit 30 notifies the switch unit 40 of the occurrence of the failure and the information about the standby port associated with the active port, and the forwarding destination information associated with the active port in the destination translation table 48 is rewritten (updated with) into the standby port.

Thereafter, the intra-device frame is forwarded not to the active port but to the standby port by use of the destination translation unit 42 and the switching unit 46. Namely, the forwarding destination of the intra-device frame (the output destination of the packet) is switched over.

Thus, in the case of adopting the "1:N switching" technique as the main signal redundancy-structuring means, the necessity for forwarding the failure information to all of the interface terminating units is eliminated by providing the switch unit 40 with the destination translation table 48, and the time needed for switching can be reduced.

In the second embodiment and the third embodiment, the destination translation table 48 is updated by the monitor control unit 30. The update of the destination translation table 48 can take, in the same way as in the first embodiment, such a scheme that the updating unit 43 receives the notification of the failure information from the interface terminating unit 50 detecting the failure related to the port and updates the destination translation table 48 without via the monitor control unit 30.

Further, in the second embodiment and the third embodiment also, in the same way as in the first embodiment, the destination translation table 48 can be structured by use of the CAM.

Moreover, the second embodiment and the third embodiment have discussed the case in which the packet forwarding device includes the "1+1 switching" technique and the "1:N switching" technique as the main signal redundancy-structuring means but can be also applied to an SDH/SONET transmitting device including the "1+1 switching" technique and the "1:N switching" technique as the main signal redundancy-structuring means.

According to the aspect of the present invention, it is feasible to provide the signal transmitting device capable of reducing the period of route switching time, which follows the occurrence of the fault in the redundancy-structured transmission routes for the signals (for example, the packets).

All example and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such example in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal transmitting device comprising:
    an ingress interface unit to determine an output port based on a destination MAC address of an input frame, to add destination information including information of the determined output port to the frame, and to output the frame added to the destination information;
    two or more egress interface units to include the output port of the frame;
    a Layer 2 switch unit to connect to the ingress interface unit and to the two or more egress interface units, to receive the frame including the destination information output from the ingress interface unit, to determine a forwarding destination of the frame based on the destination information included in the frame, and to forward the frame to at least one, as the determined forwarding destination, of the two or more egress interface units; and
    a notifying unit to notify of, when a fault related to the output port occurs, alternative destination information including information of an alternative output port which is a standby port corresponding to at least the output port;
    wherein the Layer 2 switch unit includes,
        a storage unit;
        a registration unit to receive the alternative destination information from the notifying unit and to register the alternative destination information in the storage unit in a way that associates the alternative destination information with the destination information; and
        a translation unit to rewrite, when the storage unit is registered with the alternative destination information associated with the destination information in the frame input to the Layer 2 switch unit, the destination information in the frame into the alternative destination information so that the Layer 2 switch unit determines a forwarding destination of the frame based on the alternative destination information.

2. The signal transmitting device according to claim 1, wherein the notifying unit is included in a monitoring unit which monitors an operation of at least the egress interface units, and notifies of the alternative destination information including the information of the alternative output port determined when the monitoring unit detects a fault related to the output port specified by the destination information.

3. The signal transmitting device according to claim 1, wherein the notifying unit is included in the egress interface unit, and notifies of the alternative destination information including the information of the alternative output port determined when the egress interface unit detects a fault related to the output port specified by the destination information.

4. The signal transmitting device according to claim 1, wherein
    the storage unit is stored with one or more entries each including the destination information added to the frame and forwarding destination information associated with the destination information in the ingress interface unit, and
    the registration unit, when receiving the alternative destination information from the notifying unit, updates, with the alternative destination information, the forwarding destination information in the entry including the destination information associated with the alternative destination information.

5. The signal transmitting device according to claim 1, wherein
    the storage unit is made up by use of a CAM (Contents Addressable Memory),
    the registration unit registers, in the storage unit, only the entry including the destination information and the alternative destination information associated with the destination information, and
    the translation unit searches the storage unit for the entry including the destination information in the frame input to the Layer 2 switch unit, does not execute a process of rewriting the destination information in the frame when the corresponding entry is not searched for, and rewrites the destination information in the frame with the alternative destination information included in the entry when the corresponding entry is searched for.

6. The signal transmitting device according to claim 1, wherein the output port specified by the destination information and the alternative output port specified by the alternative destination information belong to the same link aggregation group.

7. The signal transmitting device according to claim 1, wherein the output port specified by the destination information is an output port of an active line, and the alternative output port specified by the alternative destination information is an output port of a standby line used when a fault occurs in the active line.

8. A signal output destination switching method for a signal transmitting device comprising:
    an ingress interface unit to determine an output port based on a destination MAC address of an input frame, to add destination information including information of the determined output port to the frame, and to output the frame added to the destination information;
    two or more egress interface units to include the output ports for the frame; and
    a Layer 2 switch unit to connect to the ingress interface unit and to the two or more egress interface units, to receive the frame including the destination information output from the ingress interface unit, to determine a forwarding destination of the frame based on the destination information included in the frame, and to forward the frame to at least one, as the determined forwarding destination, of the two or more egress interface units, and to include a storage unit,
    the signal output destination switching method comprising:
        notifying of, when a fault related to the output port specified by the destination information occurs, alternative destination information including information of an alternative output port which is a standby port corresponding to at least the output port;

registering the notified alternative destination information in the storage unit in a way that associates the alternative destination information with the destination information; and rewriting, when the storage unit is registered with the alternative destination information associated with the destination information in the frame input to the Layer 2 switch unit, the destination information in the frame into the alternative destination information so that the Layer 2 switch unit determines a forwarding destination of the frame based on the alternative destination information.

\* \* \* \* \*